Feb. 9, 1960 M. M. SAFFORD ET AL 2,924,559
POLYETHYLENE BLEND
Filed March 27, 1956
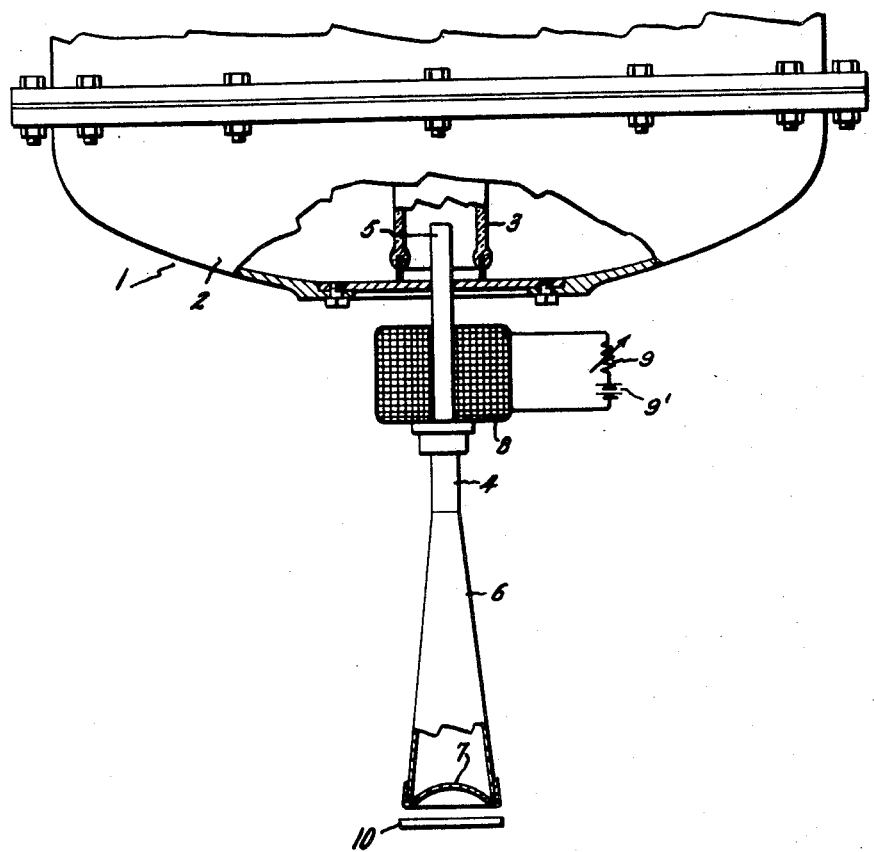
Inventors:
Moyer M. Safford,
Robert L. Myers,
by Paul A. Frank
Their Attorney.

2,924,559
POLYETHYLENE BLEND

Moyer M. Safford, Schenectady, and Robert L. Myers, Ballston Lake, N.Y., assignors to General Electric Company, a corporation of New York Application March 27, 1956, Serial No. 574,334

8 Claims. (Cl. 204—154)

This invention relates to curable compositions comprising blends of polyethylene and polymerized 1,3-butadiene (hereafter called "polybutadiene"), and to said compositions cured with high energy, ionizing radiation. More particularly, this invention relates to a process of curing blends of polyethylene and polybutadiene which comprises treating said blends with high energy, ionizing radiation.

Among the polymeric materials which have evolved in recent years, polyethylene has proved to be one of the most popular. It has found wide usage as an insulating material, as a container material, as a conduit material, etc. Fabrication, molding, extrusion and calendering of polyethylene are readily accomplished by standard methods, thus facilitating its use for many purposes. Despit all this, however, the applications of polyethylene are greatly limited by its lack of form stability, that is, the ability to retain a particular shape at elevated temperatures, and by its poor high temperature properties, such as poor high temperature tensile strength, tear strength, cut-through strength, etc.

One of the methods employed in improving the physical properties of various polymers is the incorporation of fillers therein. Although marked improvement in high temperature physical properties of polyethylene is noted when certain fillers are incorporated therein, the presence of fillers in polyethylene tends to diminish some of the electrical properties of filled polyethylene as compared to the unfilled polymer.

We have now discovered that when blends of polyethylene and polybutadiene are treated with high energy radiation, products having improved physical properties, such as improved tensile strength and elongation, excellent electrical properties, etc. are produced. The significance of this discovery is that cured products having these excellent properties can be produced at room temperature within a very short period of time without using fillers or chemical curing agents. It could not have been predicted that these blends would cure so readily with radiation, since as disclosed in the prior art, polybutadiene could be cured by heat and peroxides only over extended periods of time.

The blend of polyethylene and polybutadiene will also be referred to as "blends" and these blends cured with high energy, ionizing radiation as "cured blends."

In general, the invention can advantageously be carried out by milling polyethylene and polybutadiene on differential rubber rolls (which can advantageously be heated if desired) until a well-mixed blend is obtained. Since it is more difficult to obtain a homogeneous blend at lower temperature, milling of the ingredients is generally carried out at elevated temperatures, such as at about 100°–135° C. Thereupon, the blend can be fabricated, molded, extruded or calendered, etc. by suitable methods and the product so treated is cured upon exposure to high energy radiation.

The polyethylene referred to herein is a polymeric material formed by either the high and low pressure polymerization of ethylene. It is described in Patent 2,153,553—Fawcett et al., and in "Modern Plastics Encyclopedia," New York, 1949, pp. 268–271. Specific examples of commercially available polyethylene are the polyethylene sold by E. I. du Pont de Nemours & Co., Inc., Wilmington, Delaware, examples of which are "Alathons 1, 3, 10, 12, 14, etc.," those sold by the Bakelite Company, such as "DE-2400, DYNH, etc.," and the low pressure Phillips Petroleum Company polymers, such as "Marlex 20, 50, etc." An excellent discussion of low pressure polyethylene within the scope of this invention is found in "Modern Plastics," vol. 33, #1 (September 1955), commencing on page 85.

1,3-butadiene can enter into a polymer chain by either a 1,2- or 1,4-mode of addition; the 1,2-mode of addition results in the following "dangling vinyl" structure

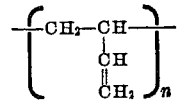

(hereafter called "1,2-polybutadiene") whereas the 1,4-mode of addition results in the following structure:

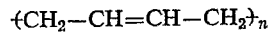

(hereafter called "1,4-polybutadiene"). Two types of catalysts are generally used to polymerize 1,3-butadiene, namely the free-radical and the alkali metal type catalysts. When 1,3-butadiene is polymerized by free-radical type catalysts, such as peroxides, persulfates, etc. in an aqueous emulsion, a higher proportion of 1,4-polybutadiene results as compared to the product produced by the alkali metal type catalyst where a higher proportion of 1,2-polybutadiene is obtained. Using free-radical catalysts, one obtains polybutadiene having less than 25% 1,2-polybutadiene.

Although blends of polyethylene and both alkali metal polymerized butadiene (also called "alkali metal polybutadiene"), and free-radical polymerized butadiene (also called "emulsion polybutadiene") can be cured with high energy, ionizing radiation to products of improved properties, such as tensile strength, etc., blends of polyethylene and alkali metal polybutadiene can be cured with high energy, ionizing radiation to products of more enhanced properties than the corresponding blends containing emulsion polybutadiene. This may be due to the fact that alkali metal polymerized butadiene which contains larger amounts of "dangling vinyl groups" (1,2-polybutadiene) is more reactive to the cross-linking influence of high energy, ionizing radiation than is free-radical cured butadiene whose has its residual double bonds "buried" in the chain of the 1,4-polybutadiene. Thus, in order to obtain the more enhanced properties, such as high tensile strengths, it is necessary to employ polybutadiene containing high percentages of the 1,2-type, i.e. over 30% and preferably 50–100% 1,2-polybutadiene.

Among the alkali metal type catalysts which have been used to produce polybutadiene having high percentages of 1,2-polybutadiene are alkali metals and compounds containing alkali metals. Thus, metals, such as lithium, sodium, potassium, rubidium, cesium, sodium-potassium alloys, and compounds of these metals, such as phenyl isopropyl potassium, triphenyl methyl sodium, lithium butyl, amyl sodium, and the like compounds have been used to effect such polymerization.

Whereas free-radical catalysts tend to produce larger amounts of 1,4-polybutadiene, catalysts of the alkali metal type tend to increase the ratio of the 1,2-polybutadiene. However, temperature as well as catalysts effect the type of polymer formed; for example, polybutadiene produced by polymerizing 1,3-butadiene with sodium at 110° C. contains about 15% of the 1,2-polybutadiene whereas 100% of 1,2-type polymer is produced when 1,3 butadiene is polymerized with sodium at −70° C. Although the ratio of the 1,2- to the 1,4-polybutadiene can be determined by ozonization, probably the more accurate method of determining this ratio is by the use of infra-red spectra. Infra-red curves identifying the different types of polymers are found in Dogadkin et al., "Rubber Chemistry and Technology," 24, pp. 591–596 (1951); Hampton, "Anal. Chem.," 21, pp. 923–926 (1949); and Meyer, "Ind. Eng. Chem.," 41, pp. 1570–1577 (1949). An excellent description of polybutadiene polymers is found in Whitby, "Synthetic Rubber," pp. 734–757, Wiley and Sons, N.Y. (1954), wherein are described methods of preparing polybutadiene falling within the scope of this invention.

Since molecular weight is related to viscosity, viscosity measurements are a convenient method of expressing the molecular weight. Although polybutadiene gums of a broad intrinsic viscosity range can be employed, we advantageously have employed polybutadiene having an intrinsic viscosity of about 1.0 to 8.0 or higher. Optimum properties are obtained using polybutadiene having an intrinsic viscosity of 3.0 to 6.0.

Inherent viscosity is determined by a viscometer, such as an Ostwald viscometer on a 0.25 percent solution of polybutadiene in benzene. This value is calculated as the natural logarithm of the ratio of flow time of the solution to the flow time of the solvent divided by the concentration in grams/100 ml. Intrinsic viscosity $[\eta]$ is obtained by extrapolating the inherent viscosity vs. concentration curve of zero concentration.

In the drawing there is shown high voltage accelerating apparatus 1 capable of producing a beam of high energy electrons for irradiating polymeric materials in accordance with the invention. High voltage accelerating apparatus 1 may be of the type disclosed in Patent 2,144,518—Westendorp assigned to the same assignee as the present application. In general, this apparatus comprises a resonant system having an open magnetic circuit inductance coil (not shown) which is positioned within a tank 2 and energized by a source of alternating voltage to generate a high voltage across its extremities. At the upper end (not shown) of a sealed off, evacuated, tubular envelope 3 is located a source of electrons which is maintained at the potential of the upper extremity of the inductance coil, whereby a pulse of electrons is accelerated down envelope 3 once during each cycle of the energizing voltage when the upper extremity of the inductance coil is at a negative potential with respect to the lower end. Further details of the construction and operation of high voltage accelerating apparatus 1 may be found in the aforementioned Westendorp patent and in "Electronics," vol. 16, pp. 128–133 (1944).

To permit utilization of the high energy electrons accelerated down envelope 3, there is provided an elongated metal tube 4, the upper portion 5 of which is hermetically sealed to tank 2, as illustrated, by any convenient means, such as silver solder. The lower portion 6 of tube 4 is conical in cross-section to allow an increased angular spread of the electron beam. The emergence of high energy electrons from tube 4 is facilitated by an end-window 7 which may be hermetically sealed to tube 4 by means of silver solder. End-window 7 should be thin enough to permit electrons of desired energy to pass therethrough but thick enough to withstand the force of atmospheric pressure. Stainless steel of about 0.002 inch thickness has been found satisfactory for use with electron energies above 230,000 electron volts or greater. Beryllium and other materials of low stopping power may also be employed effectively. By forming end-window 7 in arcuate shape as shown, greater strength for resisting the force of atmospheric pressure may be obtained for a given window thickness. Desired focussing of the accelerated electrons may be secured by a magnetic-field generating winding 8 energized by a source of direct current 9' through a variable resistor 9.

In producing cured blends according to the invention, a sheet or container thereof is supported in the path of the electrons emerging from end-window 7 as illustrated. The high energy electrons penetrate the polymeric material to a depth dependent upon their energy and effect the above modifications in the properties of the material. Of course, blend 10 can be in the form of a strip material which is passed continuously under end-window 7 at a velocity selected to give the desired irradiation dosage. Other expedients for obtaining the irradiation of these blends in various shapes (e.g., bottles, cups, tubing, filaments, pipes, etc.) will be apparent to those skilled in the art. Uniform treatment of polymeric materials having appreciable thickness can be assured by irradiating them first from one side and then the other or in some cases from both sides simultaneously. In certain instances, it may be desirable to irradiate the polymeric materials in an atmosphere of nitrogen, argon, helium, krypton, or xenon, etc., to prevent the damaging effect of any corona which may be present.

The measure of the amount of irradiation is a Roentgen unit (R) which, as usually defined, is the amount of radiation that produces one electrostatic unit of charge per milliliter of dry air under standard conditions and, as employed herein, refers to the amount of electron radiation measured with an air equivalent ionization chamber at the position of the upper surfaces of the polymeric materials. A million Roentgen units ($1 \times 10^6$ R.) is designated by the term "MR."

The total irradiation dose to which the polymer is subjected will depend on the properties desired in the crosslinked product. Thus, a total dose of from $10^4$ to $10^{10}$ R. or higher can be employed, but preferably $10^6$ to $10^8$ R. Irradiation can be carried out below room, at room, or at elevated temperatures.

It will be readily realized that other forms of electron accelerating apparatus may be employed instead of high voltage apparatus 1; for example, linear accelerators of the type described by J. C. Slater in the "Reviews of Modern Physics," vol. 20, No. 3, pp. 473–518 (July 1948), may be utilized. To decrease wasteful energy absorption between the point of exit of electrons from the accelerating apparatus and the polymeric materials, a vacuum chamber having thin entrance and exit windows may be inserted in the space.

In general, the energy of the irradiation preferably employed in the practice of our invention may range from about 50,000 to 20 million electron volts or higher depending upon materials. Although high energy electron irradiation is preferred, since it produces a large amount of easily controllable high energy, ionizing radiation within a short period of time without rendering the product radioactive, many other sources of high energy, ionizing radiation can also be used in my invention. Examples of such radition sources are gamma rays, such as can be obtained from $Co^{60}$, "burnt" uranium slugs, fission by-products, such as waste solution, separated isotopes, such as $Cs^{137}$, gaseous fission products liberated from atomic reactions, etc.; other electron sources, such as the betatron, ets.; fast or slow neutrons or the mixed neutron and gamma radiation, such as is present in certain atomic reactors; X-rays; and other miscellaneous sources, such as protons, deuterons, α-particles, fission fragments, such as are available from modern cyclotrons, etc.

In order that those skilled in the art may better understand how the present invention may be practiced, the following examples are given by way of illustration and not by way of limitation. All parts are by weight.

EXAMPLE 1

A rubbery polymer was prepared from 1,3-butadiene and finely divided sodium using the technique described in Marvel et al., "J. Polymer Science I," p. 275, (1946). The following procedure was employed: Into clean, dry bottles was placed 0.1 g. of finely divided sodium dispersed in toluene. Thereafter, 25 g. of 1,3-butadiene was charged as a liquid. A small amount of the butadiene was allowed to evaporate to displace any air remaining in the bottle. The bottles were capped, and rotated at 30° C. for a period of 48 hours. The residual catalyst was deactivated by adding 15 ml. of a 10% solution of absolute alcohol in benzene. The rubber was recovered by precipitation from a benzene solution by addition of ethyl alcohol until polymer no longer precipitated. To this precipitated product was added 0.1% of phenyl-$\beta$-napthylamine as an antioxidant based on polymer. This unwashed polymer had an intrinsic viscosity of 6.0 when measured in benzene solution. By infrared analysis, this product contained at least 60% of 1,2-polybutadiene.

EXAMPLE 2

Emulsion polybutadiene was prepared by adding 25 parts of liquid 1,3-butadiene to a chilled solution of 1.25 parts of soap flakes (Ivory Flakes), 0.3 part of potassium persulfate and 0.5 part of dodecyl mercaptan in 45 parts of water. The reaction vessel was capped and rotated continuously at 50° C. for 48 hours, then cooled to the temperature of ice-water, and the contents added with stirring to a concentrated aqueous solution (at 0° C.) of sodium chloride. Thereupon 200 cc. of a 2% $H_2SO_4$ solution was added to the slurry. After the product was freed of acid and salts by water washings, water was removed by washing with alcohol and placing the resulting product in a desiccator for 48 hours to remove the residual alcohol. An antioxidant, phenyl-$\beta$-naphthylamine, 0.1% based on polymer, was then milled into the product.

In addition to the method described in Example 2, emulsion polymerized polybutadiene can be prepared by other methods known to the art, as for example, those methods disclosed in Whitby, "Synthetic Rubber," John Wiley & Sons (1954), pp. 699–701.

A blend of 20 parts of sodium polybutadiene (prepared in the manner of Example 1) and 80 parts of polyethylene (Alathon 10) was prepared by milling these ingredients together on differential rubber rolls heated to 130° C. A corresponding blend of 20 parts of emulsion polybutadiene (prepared in the manner of Example 2) and 80 parts of polyethylene (Alathon 10) was similarly prepared. A 29 mil film of each of these compositions was prepared and irradiated with high energy electrons derived from a 800 kilovolt peak (kvp.) resonance transformer to a total dose of $20 \times 10^6$ R. and the properties of the cured product were compared with the corresponding unirradiated blend. These results are shown in Table I.

able to vary tensile strength and elongation. Thus, blends containing the following ratios, 95/5, 60/40, 50/50 can be irradiated with doses of $20 \times 10^6$ R. to $1 \times 10^8$ R. to produce room temperature tensile strengths of 2000–3000 p.s.i. and 150° C. tensile strengths of 500–900 p.s.i. Of course, these values will vary with total irradiation doses which can be varied with the thickness of the sample. Although a wide range of dosages can be employed with these compositions, we advantageously employ $10^4$ R. to $10^{10}$ R. but preferably $10^6$ R. to $10^8$ R. Furthermore, depending on desired properties, the ratio of polyethylene to polybutadiene can be widely varied, for example from about 95/5 to 5/95.

In addition to improved tensile strength, the compositions of this invention possess excellent electrical properties, such as power factor, dielectric constant, loss factor, alternating current resistivity, direct current resistivity, etc. These compositions are also less susceptible to humidity from an electrical viewpoint as compared to the corresponding inorganic filler-containing blends.

Since the products of this invention have greater hot strength than polyethylene compositions previously described, they can be used in applications where polyethylene itself has failed due to high temperature form instability. Thus, these products can be used in hot strength films or tapes for electrical insulations, for electrical parts, for example, spark plug caps, for household utensils which are used at elevated temperatures, for molded industrial parts which are subjected to high temperatures, for example, jet fuel cartridges, and the like, for industrial laminates, for conduits and containers for hot liquids, etc. as well as for other uses which will appear to those skilled in the art.

Although the presence of fillers tends to diminish the electrical properties, their presence is not precluded for certain applications; for example, conducting carbon blacks and metallic particles can be incorporated in these blends for strong but flexible heating pads and tapes. For other applications where electrical properties are of secondary importance, it may be desirable to add other fillers, such as finely divided silica aerogels, xerogels, fumed silicas, such as aerosils, silicas rendered hydrophobic by surface treatments with alcohols in the manner of U.S. Patent 2,657,149—Iler, and trialkylsilanes in the manner of Bueche et al., application Serial No. 531,829, filed August 31, 1955, assigned to the same assignee as the present application, and now abandoned. Calcium silicates, aluminas, various kinds of carbon black and other fillers can also be used. In addition, other modifying agents, such as dyes, pigments, stabilizers, plasticizers, antioxidants, etc. can also be added without departing from the scope of the invention.

*Table I*

| Ex. | Composition | Non-irradiated | | | Irradiated | | |
|---|---|---|---|---|---|---|---|
| | | Tensile Strength, p.s.i. | Percent Elongation | Temperature, °C. | Tensile Strength, p.s.i. | Percent Elongation | Temperature, °C. |
| 3 | 20 parts polybutadiene (Ex. 1) 80 parts polyethylene (Alathon 10). | 1,195 melted | 300 | Room 150 | 1,930 84.7 | 400 300 | Room 150 |
| 4 | 20 parts polybutadiene (Ex. 2) 80 parts polyethylene (Alathon 10). | 1,186 melted | 100 | Room 150 | 1,307 (¹) | 200 (¹) | Room (¹) |

¹ Too soft to measure.

From this table it is evident that the blend of sodium polybutadiene and polyethylene is more readily cured by high energy, ionizing irradiation than the corresponding blend containing emulsion polybutadiene. By increasing the dose, a more highly cross-linked material is obtained.

By varying the ratio of polyethylene (Alathon 10) to sodium polymerized polybutadiene (Example 1), we are

What we claim as new and desire to secure by Letters Patent of the United States is:

1. A cured composition comprising a polymer consisting essentially of a blend of (1) polyethylene and (2) polymerized 1,3-butadiene containing at least 30% 1,2-polybutadiene, there being 5 to 95% by weight of polyethylene based on the total weight of (1) and (2)

said blend being cured by high energy, ionizing radiation having energy equivalent to at least $5 \times 10^4$ electron volts to a dose of at least $10^6$ R.

2. A process of curing polymers which consist essentially of blends of (1) polyethylene and (2) polymerized 1,3-butadiene containing at least 30% 1,2-polybutadiene said polyethylene being present in the range of 5 to 95% by weight of the total weight of (1) and (2) which comprises treating said blends with high energy, ionizing radiation having energy equivalent to at least $5 \times 10^4$ electron volts to a dose of at least $10^6$ R.

3. The composition of claim 1 in which the polymerized 1,3-butadiene comprises at least 50% 1,2-polybutadiene.

4. The process of claim 2 in which the polymerized, 1,3-butadiene comprises at least 50% 1,2-polybutadiene.

5. The composition of claim 1 wherein electrons are the source of high energy, ionizing radiation.

6. The composition of claim 5 in which the polymerized 1,3-butadiene comprises at least 50% 1,2-polybutadiene.

7. The process of claim 2 in which electrons are used as a source of high energy, ionizing radiation.

8. The process of claim 7 in which the polymerized 1,3-butadiene comprises at least 50% 1,2-polybutadiene.

References Cited in the file of this patent

UNITED STATES PATENTS 2,369,471    Latham _____ Feb. 13, 1945

FOREIGN PATENTS 430,775    Canada _____ Oct. 23, 1945

OTHER REFERENCES

Whitby: "Synthetic Rubber," pp. 295, 734, pub. 1954.

Sisman et al.: ORNL–028, pp. 9 to 26, 78 to 92, June 29, 1951. (Copy from Technical Information Service, Oak Ridge, Tenn.)

Bopp et al.: ORNL–1373, pp. 1 to 18, 25, 26, 32, 33, 36, 37 and 52 to 71, July 23, 1953. (Copy from Technical Information Service, Oak Ridge, Tenn.)

Lawton et al.: Nature, vol. 172, pp. 76, 77 (July 11, 1953).

Lapp et al.: Nuclear Radiation Physics, pp. 433 to 436, 1948, Prentice-Hill, Inc., N.Y.C.

BNL 367, cover ii, pp. 27 and 28, February 1956.